United States Patent [19]

Nagashima

[11] Patent Number: 4,625,264
[45] Date of Patent: Nov. 25, 1986

[54] HEADLIGHT DEVICE FOR A VEHICLE

[75] Inventor: Tomoyuki Nagashima, Saitama, Japan

[73] Assignee: Honda Giken Kogyo Kabushiki Kaisha, Tokyo, Japan

[21] Appl. No.: 700,418

[22] Filed: Feb. 11, 1985

[30] Foreign Application Priority Data

Feb. 13, 1984 [JP] Japan ............................. 59-18973[U]

[51] Int. Cl.[4] ...................... F21V 15/04; F21V 21/00; B62J 6/00
[52] U.S. Cl. ........................................ 362/72; 362/390
[58] Field of Search .................. 362/53, 72, 269, 288, 362/390, 426, 427

[56] References Cited

U.S. PATENT DOCUMENTS

| | | | |
|---|---|---|---|
| 3,099,400 | 7/1963 | Holmes | 362/72 |
| 4,024,387 | 5/1977 | Alphen | 362/72 |
| 4,189,762 | 2/1980 | Nakazawa | 362/72 |
| 4,198,027 | 4/1980 | Urbanek | 362/390 X |

FOREIGN PATENT DOCUMENTS

| | | | |
|---|---|---|---|
| 2334599 | 1/1974 | Fed. Rep. of Germany | 362/72 |
| 2349371 | 4/1975 | Fed. Rep. of Germany | 362/72 |

Primary Examiner—Willis R. Wolfe, Jr.
Attorney, Agent, or Firm—Lyon & Lyon

[57] ABSTRACT

An attachment mechanism for mounting a headlight to a vehicle. A stay is associated with the headlight assembly and includes two fixed rods and two pins swingably mounted thereto. A resilient mounting block assembly is fixed to the vehicle and receives the fixed and pivotable pins for proper placement and retention of the headlight assembly without tools or complicated assembly procedures.

13 Claims, 9 Drawing Figures

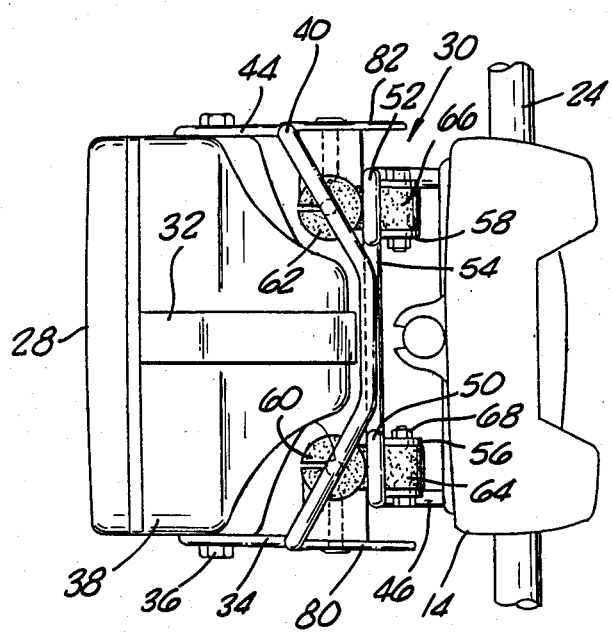
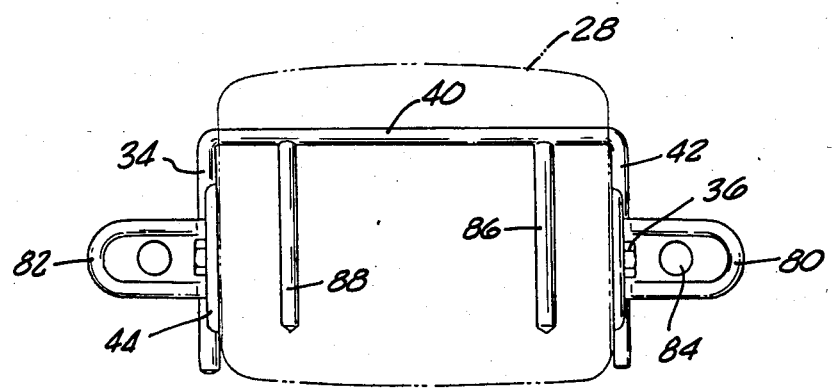

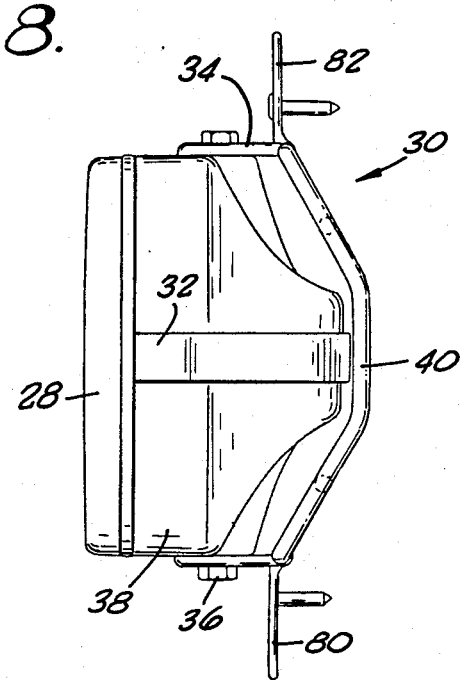
Fig.8.
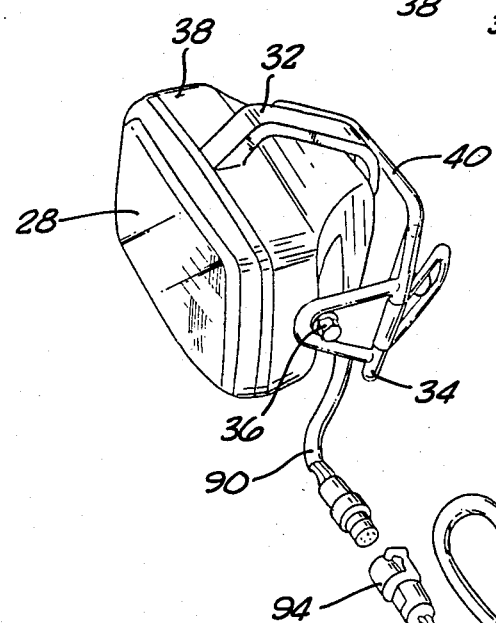
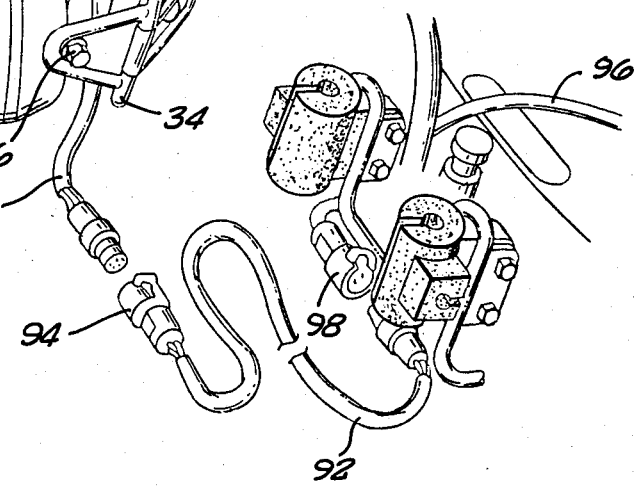
Fig.9

HEADLIGHT DEVICE FOR A VEHICLE

BACKGROUND OF THE INVENTION

The field of the present invention is mounting devices for headlights on vehicles.

Headlights typically are secured to a vehicle by rigid attachment means such as bolts or the like. With smaller vehicles such as motorcycles and all terrain cycles, the headlights are rigidly attached to the handle or upper part of the front fork or top bridge bracket of such vehicles. Tools are required for removal of headlights mounted by such means and little or no shock absorbing is available.

It has been found that balloon tired off-road vehicles may be employed for utility purposes where, at night, it is advantageous to use the headlight on the vehicle for illuminating objects. Naturally, it is not always practical to have the vehicle oriented such that the light will shine on the area to be illuminated. Because of the difficulty in removing conventional headlights and the need for tools to do so, other lighting means are often required where the vehicle cannot be easily oriented to illuminate the required subject.

SUMMARY OF THE INVENTION

The present invention is directed to a headlight attachment mechanism for mounting of headlights on a vehicle. A resilient mounting assembly associated with the vehicle is employed to advantageously reduce shock to the headlight and to enable the headlight to be removed easily and without tools. On off-road vehicles, shock absorbing characteristics are of advantage to the longevity of the lighting mechanism. The ability to remove the headlight easily enables a desired subject to be illuminated without requiring the orientation of the vehicle such that a mounted headlight might be advantageously directed.

To provide the foregoing, a headlight may be fixed to a stay which is in turn mounted to a resilient mounting block assembly associated with the vehicle. The stay preferably includes a first receiving cavity for accepting a fixed member of the stay and a second receiving cavity for receipt of a pivoted member of the stay. The second cavity is preferably split such that the pivoted member may be forced laterally into the cavity to insure an interlocking between the resilient mounting assembly and the stay. By means of this mechanism, an operator may place or remove the headlight easily and without the need for tools.

Accordingly, it is an object of the present invention to provide an improved headlight attachment mechanism for vehicles. Other objects and advantages will appear hereinafter.

BRIEF DESCRIPTION OF THE DRAWINGS

FIG. 3 is a plan view of the headlight attachment mechanism.

FIG. 5 is a back view of the stay of the present invention.

FIG. 8 is a plan view of the detached headlight and stay assembly.

FIG. 9 is an oblique view of the detached headlight and stay assembly and of the resilient mounting block assembly.

DETAILED DESCRIPTION OF THE PREFERRED EMBODIMENT

Figure 1:
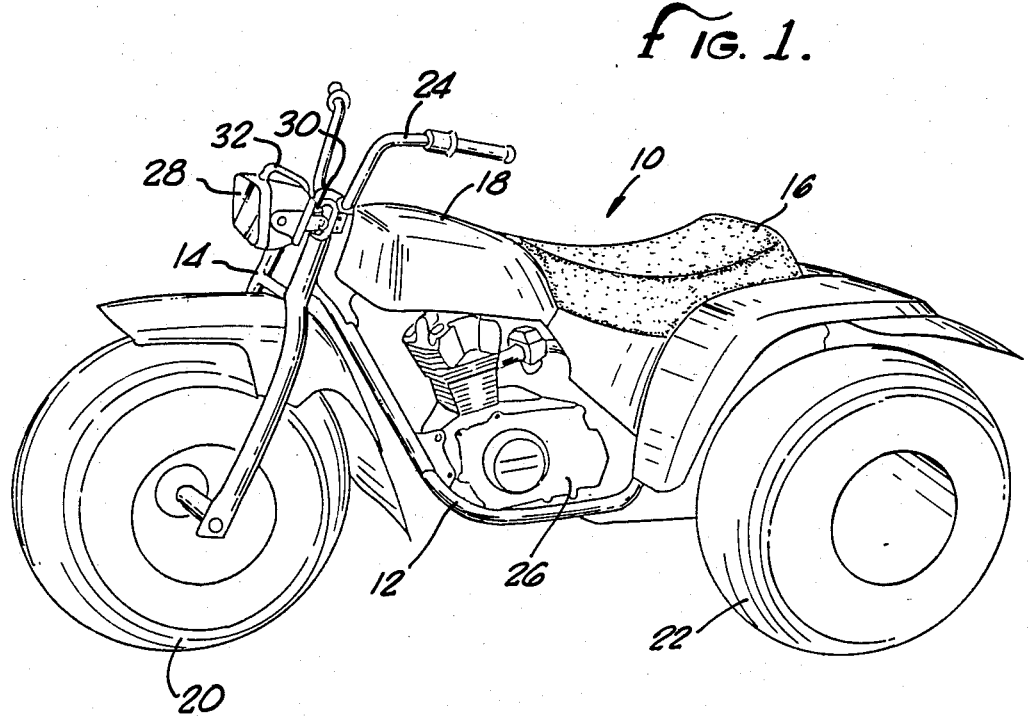
FIG. 1 is a prospective view of a vehicle employing the present invention.
Figure 2:
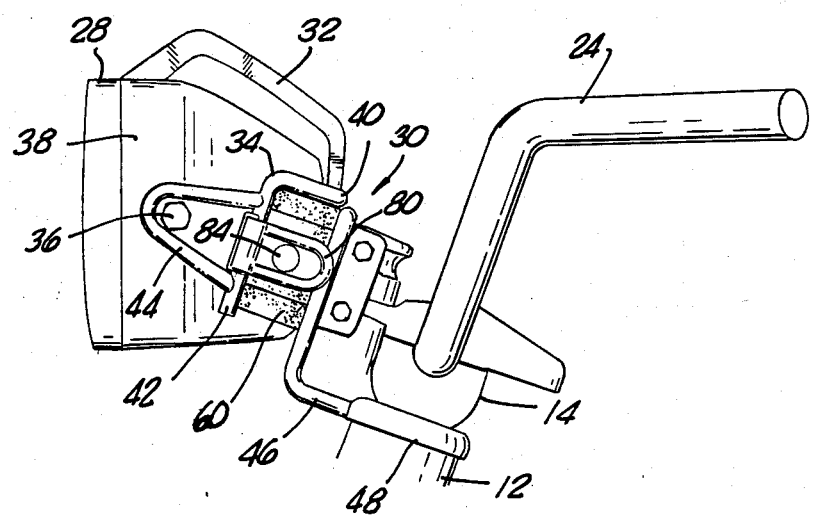
FIG. 2 is a side view of a headlight attachment mechanism of the present invention.
Figure 4:
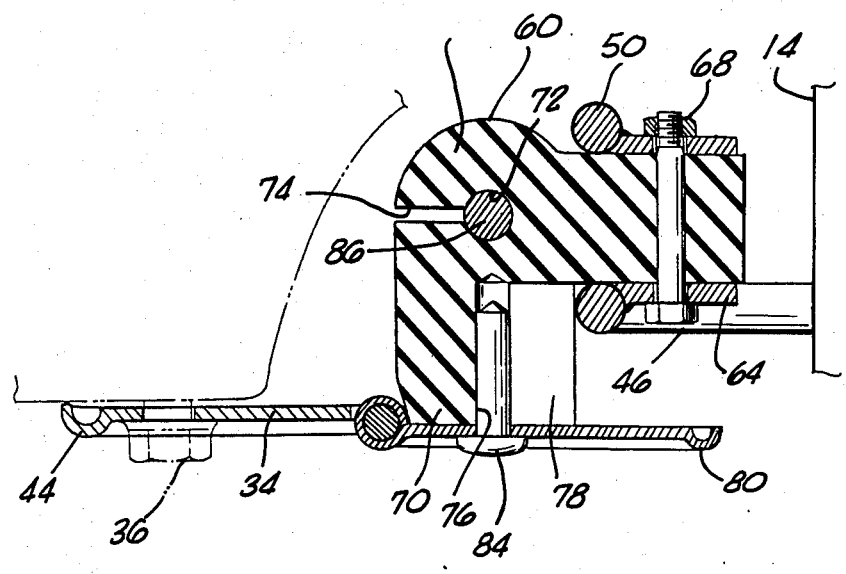
FIG. 4 is a cross sectional plan view of one resilient mounting block of the present invention.
Figure 6:
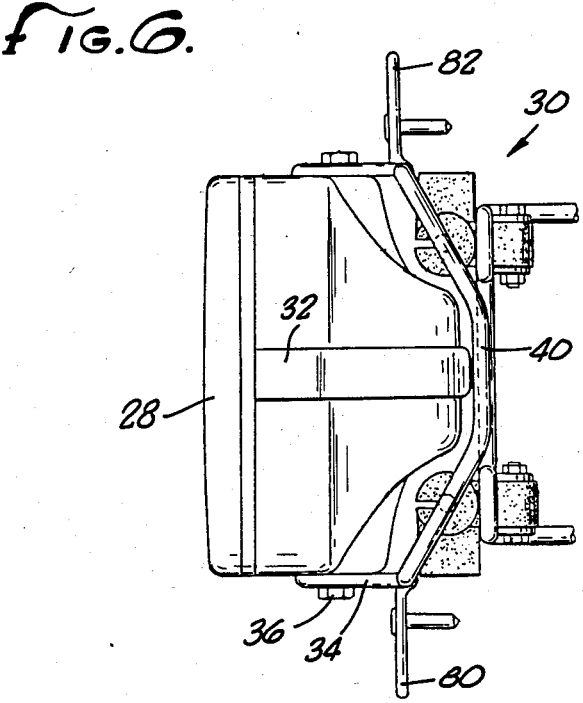
FIG. 6 is a plan view of the present invention with the stay partially disassembled from the resilient mounting block assembly.
Figure 7:
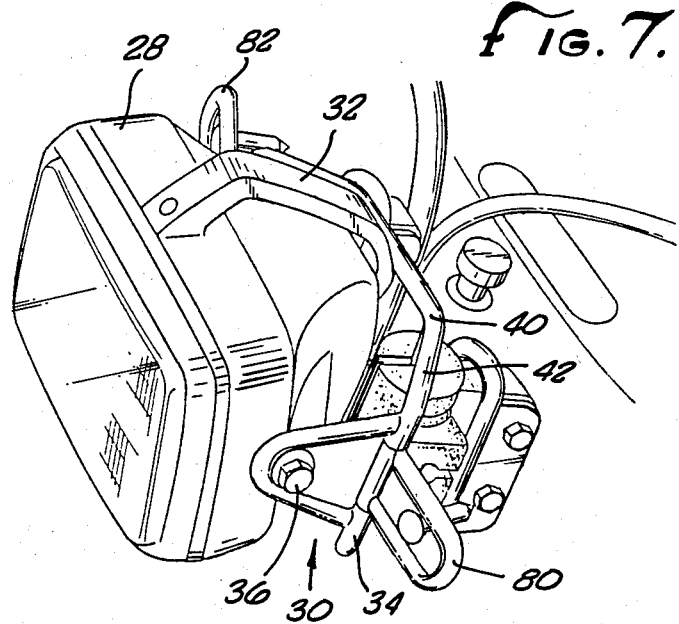
FIG. 7 is an oblique view of the device of FIG. 6.

Turning in detail to the drawings, an off-road three-wheel vehicle is illustrated as including a body 10, having a frame 12, a front fork assembly 14, a seat 16 and a fuel tank 18. A front wheel 20 is mounted to the front fork 14 while left and right rear wheels 22 are mounted to the rear of the vehicle. The front fork includes handlebars 24. An engine 26 is mounted to the frame 12.

Mounted to the front fork assembly to face forwardly of the vehicle 10 is a headlight 28. The headlight 28 is mounted to the front fork assembly by a headlight attachment mechanism 30. The headlight attachment mechanism 30 is designed as will be seen through inspection of the detailed figures to resiliently mount the headlight 28 and to allow separation of the headlight 28 from the front fork assembly 14 without tools. A handle 32 is provided on the headlight 28. The handle 32 provides a convenient means for holding the headlight in view of its detachability from the vehicle.

The headlight attachment mechanism 30 is illustrated as including a stay 34 which is fixed to the headlight 28 by means of bolts 36. The headlight may include a body 38 to enclose the lamp and form an attachment mechanism for the stay 34. The stay includes a transverse railing 40 with vertical railings 42 extending downwardly from either side thereof. Two brackets 44 extend forwardly to either side of the headlight assembly housing 38 for attachment thereto by means of fasteners 36.

For attachment of the stay 34 to the vehicle, a resilient mounting block assembly is fixed to the vehicle by means of a supporting stay 46. The supporting stay 46 may conveniently be attached to the top bridge 48. Alternately, if the headlight is to swing with the front fork assembly 14, alternate attachment may be employed. The stay 46 extends forwardly from the top bridge 48 with two U-shaped sections 50 and 52 spaced apart by a center strut 54. Supporting pieces 56 and 58 are positioned within the U-shaped sections 50 and 52 to receive two resilient mounting blocks 60 and 62. The resilient mounting blocks 60 and 62 include mounting block bases 64 and 66 which are fixed to the supporting pieces 56 and 58 by means of conventional fasteners 68.

Each mounting block 60 and 62 is provided with two bosses 69 and 70. The first boss 69 includes a vertical cavity 72 extending therethrough with a slit 74 extending the length of the cavity 72. The slit 74 extends outwardly to the surface of the boss 69 of the resilient material. The second boss 70 includes a laterally extending cavity 76 which also has a slit 78 extending to the surface of the block. The blocks 60 and 62 are right and left hand.

Associated with the stay 34 fixed to the headlight are two swing pieces 80 and 82. These swing pieces 80 and 82 are pivotally mounted to the vertical railings 42. Pins 84 extend from the swing pieces 80 and 82 at a distance from the pivot axes thereof in a plane normal to the axes. Associated with the stay and specifically the transverse railing 40 are two depending rods 86 and 88. The depending rods 86 and 88 are spaced apart and mutually parallel.

The rods 86 and 88, the pins 84 and the associated swing pieces 80 and 82 are arranged such that the rods 86 and 88 may be forced through the slots 74 into position on the resilient mounting blocks 60 and 62. This forms a first attachment for the stay on the vehicle. The swing pieces 80 and 82 may then be pivoted such that the pins 84 enter the cavities 76 laterally through the slits 78. Once in position, the rods 86 and 88 and the pins 84 fit snugly within the mounting block assembly. Because of the orientation of the pins 84 extending at angles to the rods 86 and 88 a secure mounting of the headlight assembly is accomplished. Furthermore, the assembly and disassembly of the headlight assembly relative to the vehicle may be accomplished without tools. The swing pieces 80 and 82 have extended portions for additional mechanical advantage to insure easy operation.

Looking specifically to FIG. 9, a headlight wiring harness 90 is shown to be coupled with a joint harness 92 by means of a coupling 94. The joint harness 92 is in turn coupled with the main vehicle harness 96 by means of an additional coupling 98. The joint harness 92 may conveniently be of substantial length such that once removal of the headlight is accomplished, power may be supplied to the headlight as it is moved for illumination of objects not in the direct path of the vehicle.

Thus, an improved headlight attachment mechanism is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A headlight attachment mechanism for mounting a headlight on a vehicle, comprising
    a stay fixed to the headlight including a mounting axis defined in said stay, at least one rod rigidly fixed to said stay, at least one swing piece pivotally mounted to said stay at said mounting axis and a pin fixed to said swing piece at a distance from said mounting axis of said swing piece; and
    a resilient mounting block assembly fixed to the vehicle including a first elongate cavity sized for snug receipt of said rod and a second elongate cavity for snug receipt of said pin, said second elongate cavity including a slit extending laterally from said second elongate cavity to the surface of said resilient mounting block assembly for passage of said pin laterally into said second elongate cavity, said second elongate cavity being nonparallel to said first elongate cavity and said pin being forceably pivotable into said second elongate cavity through said slit with said rod in said first elongate cavity.

2. The headlight attachment mechanism of claim 1 wherein there are two said rods and two said first elongate cavities for receipt of said rods.

3. The headlight attachment mechanism of claim 2 wherein said two rods are parallel and displaced from one another.

4. The headlight attachment mechanism of claim 1 wherein there are two said swing pieces, two said pins and two said second elongate cavities for receipt of said pins, said pins extending toward one another from either side of said resilient mounting block assembly when positioned in said second cavities.

5. The headlight attachment mechanism of claim 4 wherein said resilient mounting block asembly includes two resilient mounting blocks fixed to the vehicle, each said resilient mounting block having a said second elongate cavity therein.

6. A headlight attachment mechanism for mounting a headlight on a vehicle, comprising
    a stay including two mounting axes defined in said stay two rods rigidly fixed to said stay, two swing pieces pivotally mounted to said stay at said mounting axes and two pins fixed to said swing pieces at a distance from said mounting axes of said swing pieces; and
    a resilient mounting block assembly fixed to the vehicle including two first elongate cavities sized for snug receipt of said rod, said first elongate cavities each including a first slit extending laterally from said first elongate cavity to the surface of said resilient mounting block assembly for passage of a said rod laterally into said first elongate cavity, and two second elongate cavities for snug receipt of said pins, each said second elongate cavity including a second slit extending laterally from said second elongate cavity to the surface of said resilient mounting block assembly for passage of a said pin laterally into said second elongate cavity, said second elongate cavities being nonparallel to said first elongate cavities and said pins being forceably pivotable into said second elongate cavities through said second slits with said rods in said first elongate cavities.

7. The headlight attachment mechanism of claim 6 wherein said two rods are parallel and displaced from one another.

8. The headlight attachment mechanism of claim 6 wherein said resilient mounting block assembly includes two resilient mounting blocks fixed to a vehicle, each said resilient mounting block having a said first elongate cavity therein and a said second elongate cavity therein.

9. The headlight attachment mechanism of claim 6 wherein said rods are parallel and displaced from one another and said pins lie in a plane substantially normal to said rods.

10. The headlight attachment mechanism of claim 6 further including the headlight.

11. The headlight attachment mechanism of claim 6 wherein said stay further includes a transverse railing, said rods being fixed at one end to said transverse railing.

12. The headlight attachment mechanism of claim 11 wherein said stay further includes vertical railings at either end of said transverse railing, said swing pieces being pivotally mounted to said vertical railings.

13. The headlight attachment mechanism of claim 12 wherein said pins lie in a plane normal to said vertical railings, said vertical railings being substantially parallel to said rods.

* * * * *